Feb. 21, 1939.  A. K. ANTONSEN  2,148,227
STARTING SYSTEM
Filed June 3, 1937
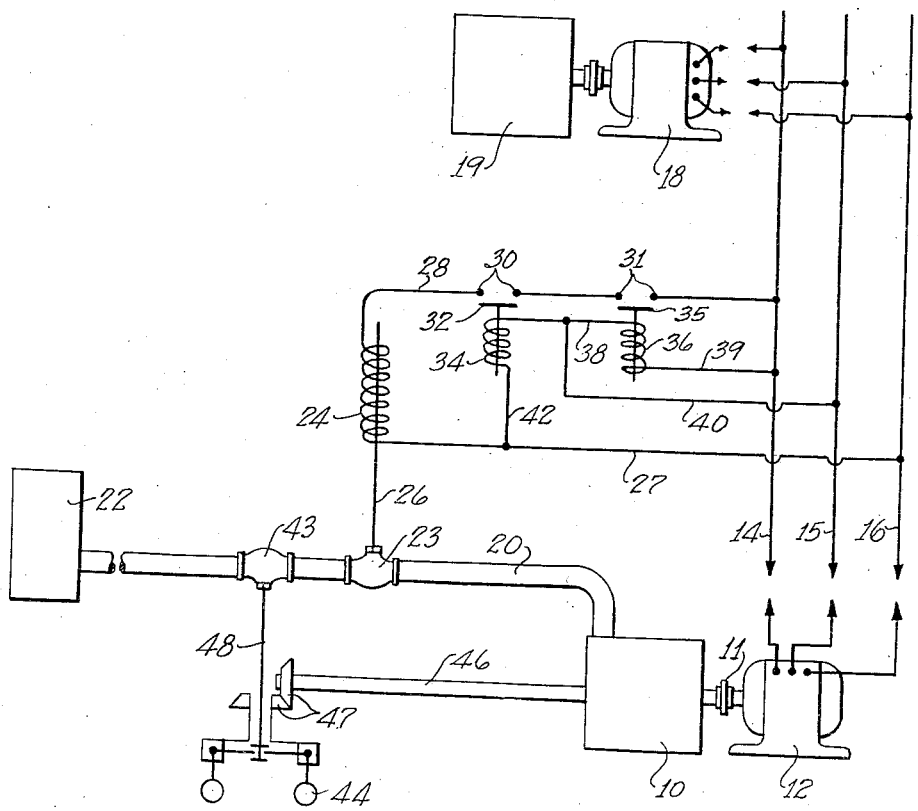
INVENTOR
Anker K. Antonsen.
BY
ATTORNEY Patented Feb. 21, 1939

2,148,227

UNITED STATES PATENT OFFICE 2,148,227

STARTING SYSTEM

Anker K. Antonsen, Skaneateles, N. Y., assignor to Fairbanks, Morse & Co., Chicago, Ill., a corporation of Illinois Application June 3, 1937, Serial No. 146,149

6 Claims. (Cl. 290—30)

This invention relates to improvements in starting systems for internal combustion engines, and more particularly to an improved method and means for initiating and controlling the starting of an engine responsively to a demand for its operation.

The control system embodying the improved features of the present invention is adapted particularly, for use in connection with internal combustion engines of the Diesel type which utilize fluid under pressure, such as compressed air, for starting purposes. Among the objects of the invention may be noted the adaptation of the improved control mechanism to a system in which the fluid-start engine serves as a prime mover for an auxiliary or emergency stand-by generator, provided for supplying power to an electric circuit which is otherwise normally supplied from one or more main generating units. In the system, the arrangement of the control mechanism is such as to initiate starting of the auxiliary engine and generator unit responsively to failure of the main power source to supply power to the electric circuit served thereby. Thus a substantially uninterrupted supply of electric power to the circuit may be maintained. Furthermore, the starting control mechanism is adapted through a novel arrangement of control apparatus, to conserve the supply of starting air for the auxiliary engine, by stopping the delivery of compressed air thereto, when the engine has attained a predetermined speed.

Another object is attained in the provision of a control system for the purpose noted, which includes mechanism of electrically operated type, for initiating a delivery of starting air to the engine, and an engine speed responsive mechanism for stopping such delivery of starting air, upon the engine attaining a predetermined speed.

Further objects and advantages will appear from the following description, and from the drawing, the single figure of which is a diagrammatic illustration of the improved control system embodying the features of the invention.

Referring now to the drawing by suitable characters of reference, there is illustrated diagrammatically, a preferred form of control system as applied to an internal combustion engine 10 preferably of Diesel type. The engine is operatively coupled, as at 11, to an auxiliary generator 12 of a three-phase, alternating current type, serving as an emergency standby source of electrical energy for a three-phase distribution circuit including line conductors or bus bars 14, 15 and 16. The distribution circuit is normally supplied from a main generator 18 of three-phase, alternating current type which is driven by an engine 19 or by any other suitable prime mover. It is to be understood, of course, that the control arrangement embodying the features of this invention may be utilized in conjunction with a single or multi-phase alternating current system, or with a direct current system, the three-phase system illustrated being an example only.

Engine 10 is, by preference, of the air-start type, air under pressure for starting purposes being supplied to the engine through a conduit 20 connected to the engine and to a suitable source of air under pressure, such as a compressed air tank or reservoir 22. A valve 23 is suitably disposed in the conduit 20 so as to control the flow of compressed air to the engine, for delivery to one or more of the engine cylinders (not shown), the valve being of any suitable form, but preferably of gravity- or spring-opened type which is readily available and well known in the art. The valve is normally held closed by an electromagnet 24 functionally associated with the stem 26 of the valve, the valve being closed when the electromagnet is energized. The energizing circuit for the electromagnet includes a lead 27 connected to the distribution conductor 16 and to one end of the electromagnet, and a lead 28 from the opposite end of the magnet to the conductor 14 through paired contacts 30 and 31. The opening and closing of the circuit through contacts 30 is controlled by an armature 32 of a relay 34, while contacts 31 are controlled in like manner by armature 35 of a second relay 36. The relay coils are connected in series through a conductor 38 and are in circuit with the conductors 14, 15 and 16 through leads 39, 40 and 42—27, in the manner shown. Thus it will be observed from the circuit arrangement of the relays, that relay 34 is responsive to the phase-voltage between line conductors 15 and 16, relay 36 to the phase-voltage between conductors 14 and 15, and both relays to the phase-voltage between conductors 14 and 16.

A second valve 43 is suitably disposed in the conduit 20, this valve being by preference, similar to valve 23, but controlled by mechanism operatively associated with the engine 10, the control arrangement being such that the valve is normally in open position when the engine 10 is not in operation, and is closed responsively to the engine attaining a predetermined speed. The control mechanism for this valve is diagrammatically illustrated in the drawing as a centrifugal device, denoted at 44, which is operated by engine 10 through a shaft 46 operated thereby and gears 47, the centrifugal device operating in turn, upon the stem 48 of valve 43. Although the centrifugal device 44 and the engine operated shaft 46 and gears 47 operatively connecting the device to the engine are shown in a diagrammatic manner by way of example, it is to be understood that any suitable type of centrifugal or other speed responsive device and any desired form of operative association thereof with engine 10 and valve 43, may be utilized.

The operation of the system will be now particularly pointed out. So long as the distribution conductors 14, 15 and 16 are supplied from the main generator 18, the emergency generator 12 and its driving engine 10 will be normally idle. In this case, the relays 34 and 36 will be energized from main generator 18 through their connection with the distribution conductors 14, 15 and 16, this resulting in actuation of the armatures 32 and 35 to close the contacts 30 and 31, hence closing the circuit lead 28 of electromagnet 24. Thus the electromagnet 24 is energized to effect a positive closure of valve 23 through operation of valve stem 26. As a result, compressed air from the reservoir 22 will be prevented by the closed valve 23, from flowing to the engine 10 for starting the emergency unit. In this instance, valve 43 will be open since, as before noted, this is the normal condition of the valve when the engine 10 is not in operation.

Should main generator 18 fail for any reason, to supply power to the distribution system, or should power in any one or more of the phases of the system fail for any cause, then one or both of the relays 34 and 36 will become de-energized. Since energization of both relays is relied upon to maintain, through closure of the paired contacts 30 and 31 by the armatures 32 and 35 respectively, a closed circuit in lead 28 for energizing the valve magnet 24, it will be readily observed that a de-energization of one or both of these relays will effect an open circuit of the magnet 24 through one or both pairs of contacts 30 and 31, thus effecting a de-energization of the valve magnet. With the de-energization of magnet 24, the valve 23 opens under the influence of gravity or of a spring (not shown), to permit a flow of compressed air through conduit 20 to the engine 10 (valve 43 being in open position at this time, as heretofore noted). Thus the compressed air may be utilized to start engine 10, and when the engine attains a predetermined speed, the centrifugal device 44 operated thereby, will effect a closure of valve 43 to cut-off further delivery of air to the engine. Thereafter, under normal conditions, the engine will continue to operate under its own power, attaining its normal running speed to operate emergency generator 12 for supplying power to the three-phase system, until such time as the system may be again supplied from the main unit 18—19. It will be observed that valve 43 remains closed throughout the operation of engine 10, and that valve 23 will close upon the energizing of relays 34 and 36 from emergency generator 12. When the system is again supplied from main generator 18, the energization of the relays continues, as supplied by generator 18, so as to hold the valve 23 closed. Thereafter, engine 10 may be shut down, thus stopping centrifugal device 44 and thereby opening valve 43.

Closure of valve 43 by device 44, is attained at a predetermined engine speed which is substantially less than normal, full running speed of engine 10, this being done in order to conserve the supply of compressed air in reservoir 22 for subsequent starting of the engine. The speed at which device 44 is regulated to effect a closure of valve 43 is, by preference, determined as near the minimum firing speed of the engine as is practicable, say between ¼ and ⅓ full speed. Thus, the consumption of air may be limited to substantially the minimum volume required for starting purposes. In this manner, waste of starting air may be considerably reduced, so that a greater number of starting operations of the engine 10 may be attained with a given volume of air in reservoir 22 than could be obtained heretofore. This is of particular advantage where the size and capacity of reservoir 22 is limited by space requirements, as in ships and the like.

The complete control system for the emergency engine-generator unit, as illustrated, is simple and efficient in operation, and fully attains the foregoing objects and others readily apparent but not enumerated. It is to be noted in this connection, that although only a single preferred embodiment of the invention is shown, the arrangement of the control system and the elements thereof, may be altered or modified within the spirit and full intended scope of the invention, as defined by the appended claims.

I claim:—

1. In combination with an electric power distribution circuit, an electric generator, an internal combustion engine for driving said generator, a supply of fluid under pressure, connected to the engine for starting purposes, means controlling the delivery of said fluid to the engine, including a valve in the line of fluid flow to the engine, and a valve actuator of magnetic type, operatively associated with said valve, said magnetic valve actuator being electrically connected to said distribution circuit so as to be operable responsively to predetermined electrical conditions of said circuit, and means functioning independently of said valve, operable responsively to a predetermined minimum speed of said engine, to prevent delivery of fluid to the engine.

2. In combination with an electric power distribution circuit, an electric generator, an internal combustion engine for driving said generator, a supply of fluid under pressure, a conduit for conducting fluid from said supply to the engine for starting purposes, a control valve in said conduit, an electromagnetic valve actuator energized directly from said distribution circuit, said actuator being operatively associated with said valve and adapted when energized to maintain said valve closed, means responsive to predetermined electrical conditions of said distribution circuit, for controlling the energization of said electromagnetic valve actuator, and means associated with said conduit and operable independently of said control valve and valve actuator, for controlling the flow of fluid therethrough, said last means being functionally associated with said engine so as to be operable responsively to predetermined speed conditions thereof.

3. In combination with an electric power distribution circuit, an electric generator, an internal combustion engine for driving said generator, a supply of air under pressure, a conduit for conducting air from said supply to the engine for starting purposes, a pair of valves in said conduit, adapted for controlling flow of air therethrough, one of said valves being normally open and the other normally closed, a valve-actuator of magnetic type in circuit with said distribution circuit, and operatively associated with said normally closed valve, said actuator adapted when energized to maintain said valve closed, means operatively responsive to predetermined electrical conditions of said distribution circuit, arranged for controlling the energization of said magnetic actuator, and means of centrifugal type associated with said normally open valve, operatively responsive to predetermined speed conditions of said engine, for controlling said valve.

4. A starting system for an internal combustion engine of air start type, in combination with an electric distribution circuit of multi-phase type and a multi-phase electric generator therefor, operated by said engine, a source of air under pressure, a conduit for conducting compressed air from said source to the engine for starting purposes, a control valve in said conduit, a valve-operating means therefor, of electromagnetic type, said electromagnetic valve-operating means being energizable directly from said distribution circuit, a control circuit for said electromagnetic means, adapted for controlling the energization thereof in response to predetermined electrical conditions of one or more phases of said multi-phase distribution circuit, a second control valve in said conduit, said second valve being normally open, and engine speed responsive valve operating means for said second valve, operable in response to a predetermined minimum speed condition of said engine, to effect a closure of said second valve.

5. In combination with an electric distribution circuit normally supplied with electrical energy from a main generator, an auxiliary generator for said circuit, an internal combustion engine for driving said auxiliary generator, a source of air under pressure, a conduit for conducting air from said source to the engine for starting purposes, a valve in said conduit, a valve-actuator therefor, of electromagnetic type, adapted when energized to maintain said valve in closed position, an energizing circuit for said actuator directly connected to said distribution circuit, and a plurality of electromagnetic contactors controlling said energizing circuit, said contactors being operatively responsive to electrical conditions in different portions of said distribution circuit and adapted upon electrical failure in any one or more of said portions of the distribution circuit, to effect deenergization of said actuator.

6. In combination with an electric distribution circuit normally supplied with electrical energy from a main generator, an auxiliary generator for said circuit, an internal combustion engine for driving said auxiliary generator, a source of air under pressure, a conduit for conducting air from said source to the engine for starting purposes, a valve in said conduit, a valve-actuator therefor, of electromagnetic type, adapted when energized to maintain said valve in closed position, an energizing circuit for said actuator, connected to said distribution circuit, a plurality of electromagnetic contactors controlling said energizing circuit, operation of said contactors being directly responsive to electrical conditions in different portions of said distribution circuit, each of said contactors being adapted to effect deenergization of said valve-actuator upon electrical failure in that portion of the distribution circuit to which the contactor is responsive, a second valve in said conduit, said valve normally being open, and a speed responsive device operated by said engine, adapted for effecting closure of said second valve in response to a predetermined minimum engine speed.

ANKER K. ANTONSEN.